(12) United States Patent
Kugler et al.

(10) Patent No.: US 12,472,619 B2
(45) Date of Patent: Nov. 18, 2025

(54) POWER TOOL STAND (71) Applicant: BLACK & DECKER INC., New Britain, CT (US)

(72) Inventors: Marco Kugler, Waldbrunn-Haused (DE); Rafael Gottschling, Selters-Eisenbach (DE); Michael Kunz, Dorndorf (DE); Jörg Roth, Schwalheim (DE)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/419,067

(22) Filed: Jan. 22, 2024

(65) Prior Publication Data
US 2025/0236008 A1  Jul. 24, 2025

(51) Int. Cl.
*B25H 1/00* (2006.01)
*B23B 45/00* (2006.01)

(52) U.S. Cl.
CPC ......... *B25H 1/0042* (2013.01); *B23B 45/003* (2013.01); *B25H 1/0064* (2013.01)

(58) Field of Classification Search
CPC .... B25H 1/0042; B25H 1/0064; B23B 45/003
See application file for complete search history.

(56) References Cited

U.S. PATENT DOCUMENTS

| | | | |
|---|---|---|---|
| 7,226,256 B2 | 6/2007 | Huang | |
| 9,227,285 B1 | 1/2016 | Briggs | |
| 2013/0089382 A1 | 4/2013 | Baditoi et al. | |
| 2015/0266105 A1 | 9/2015 | Scheid et al. | |
| 2018/0056465 A1 | 3/2018 | Koshiishi | |
| 2019/0321896 A1 | 10/2019 | Carlson et al. | |
| 2021/0234428 A1 | 7/2021 | Gill | |

FOREIGN PATENT DOCUMENTS

| | | |
|---|---|---|
| DE | 19703911 B4 | 7/2014 |
| EP | 0992320 B1 | 11/2005 |
| EP | 3006145 A1 | 4/2016 |
| EP | 3160684 B1 | 1/2018 |
| EP | 4306267 A1 | 1/2024 |
| GB | 2619922 B | 12/2023 |

OTHER PUBLICATIONS

Extended European Search Report dated Dec. 14, 2023 in related application No. 23177865.5, 8 pages.
GB Search Report dated Dec. 13, 2022 in related application No. GB2209009.6, 1 page.

*Primary Examiner* — Michelle Lopez
(74) *Attorney, Agent, or Firm* — Stephen R. Valancius (57) ABSTRACT A power tool stand includes a base and a frame connected to the base. A power tool carriage is mounted on the frame. A tool interface is mounted on the power tool carriage and arranged to secure a removeable power tool. The power tool carriage comprises at least one duct configured to convey a fluid. The tool interface includes a moveable fluid connector in fluid communication with the at least one duct wherein the moveable fluid connector is configured to move from a first position to a second position.

18 Claims, 8 Drawing Sheets

POWER TOOL STAND

FIELD

The present disclosure relates to a power tool stand. In particular the present disclosure relates to drill power tool stand.

DESCRIPTION OF RELATED ART

Some power tools are mountable on a tool stand. For example, certain drills can be mountable on a drill stand. This can improve the stability of the power tool during use and ensure that the power tool alignment with respect to the workpiece remains fixed during use. Furthermore, the power tool stand can be mountable onto the workpiece and this can further improve precision during operation.

One such power tool stand is shown in US 2019/0321896 which shows a drill stand on which a battery powered drill can be mounted. A problem with this is that the drill power tool is very large and heavy and this makes mounting and using the drill power tool on the drill power tool stand cumbersome. For example, the base of the drill power tool stand may need to be weighted down during use to stop it toppling over when used in a vertical orientation.

Once the drill described in US 2019/0321896 is mounted on the drill stand, then suitable dust management and lubrication management hoses may need to be attached to the drill. These hoses can interfere with the operation of the drill when installed on the drill stand. This may make setup, use and removal of the drill on the drill stand awkward and time consuming.

SUMMARY

Examples of the present disclosure aim to address the aforementioned problems.

According to an aspect of the present disclosure there is a power tool stand comprising: a base; a frame connected to the base; a power tool carriage mounted on the frame; and a tool interface mounted on the power tool carriage arranged to secure a removeable power tool; wherein the power tool carriage comprises at least one duct configured to convey a fluid; and the tool interface comprises a moveable fluid connector in fluid communication with the at least one duct wherein the moveable fluid connector is configured to move from a first position to a second position.

Optionally, the moveable fluid connector is slidable between the first position and the second position.

Optionally, the power tool stand comprises a slider mechanically coupled to the moveable fluid connector and an actuating eccentric and the slider comprises a recess configured to engage the actuating eccentric.

Optionally, the moveable fluid connector is configured to engage with a power tool fluid duct when the moveable fluid connector is in the second position and the removeable power tool is mounted to the power tool carriage.

Optionally, the power tool stand comprises a locking mechanism arranged to secure the removeable power tool to the power tool carriage in a locked position and release the removeable power tool in an unlocked position.

Optionally, the locking mechanism comprises a locking bolt configured to engage a reciprocal recess in the removeable power tool when the locking mechanism is in the locked position.

Optionally, the locking mechanism comprises at least one linkage mechanically coupled to the moveable fluid connector.

Optionally, when the locking mechanism moves from the unlocked position to the locked position the at least one linkage is configured move the moveable fluid connector from the first position to the second position.

Optionally, the moveable fluid connector is slidably mounted in a connector bore and the connector bore comprises at least one elongate guide rib and the moveable fluid connector comprises at least one slot configured to engage with the at least one elongate guide rib.

Optionally, the at least one duct is a water duct connectable to a supply of water.

Optionally, the at least one duct is an air duct connectable to supply of air or a vacuum supply.

Optionally, the at least one duct comprises a duct inlet mounted on a first side of the power tool carriage.

Optionally, the duct inlet comprises a toolless connection arranged to connect to a water hose, an air hose, or a vacuum hose.

Optionally, the moveable fluid connector is mounted on a second side of the power tool carriage.

Optionally, the at least one duct is connectable to a valve arranged to selectively adjust the flow of fluid to and/or from the portion of the removeable power tool.

Optionally, the power tool carriage comprises a housing and the at least one duct is routed inside the housing.

Optionally, the tool interface comprises a power tool interface mounted on the power tool carriage arranged to mechanically and electrically connect the removeable power tool to the power tool carriage.

Optionally, the tool interface comprises a battery interface mounted on the power tool carriage arranged to mechanically and electrically connect a removeable battery to the power tool carriage.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
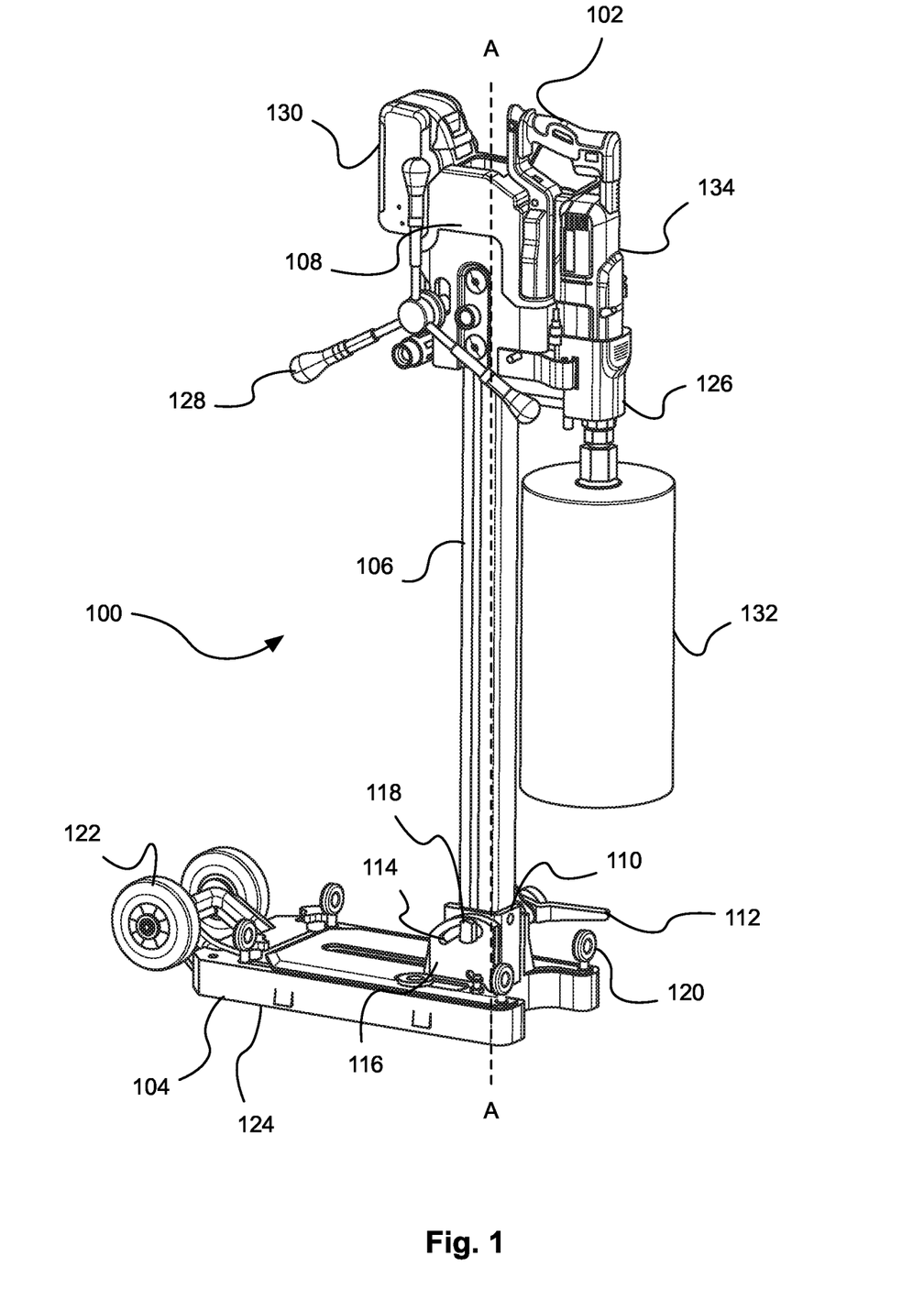
FIG. 1 shows a perspective view of a power tool stand according to an example.

FIG. 1 shows a perspective view of a power tool stand 100 according to an example. The power tool stand 100 is arranged to receive a removeable power tool 102. The removeable power tool 102 can be mounted and secured in the power tool stand 100 as required by the user. The term "removeable" refers to the function of the removeable power tool 102 being selectively removeable from the power tool stand 100. In other words, the removeable power tool 102 is not permanently fixed to the power tool stand 100.

The removeable power tool 102 as shown in FIG. 1 is a drill. In particular, the removeable power tool 102 is a diamond core drill. In other examples, the removeable power tool 102 can be hammer drill, a router, a reciprocating saw, plunge saw, a circular saw, an impact driver, a drill, a hammer drill, a multitool, an oscillating tool, a rotary hammer, a chipping hammer or any other similar power tool mountable on a power tool stand 100.

The power tool stand 100 comprises a base 104 and a frame 106 fixed to the base 104. The frame 106 projects from the base 104. A power tool carriage 108 is optionally moveably mounted on the frame 106 and moveable along a longitudinal axis A-A of the frame 106. By moving the power tool carriage 108 along the frame 106, the distance between the power tool carriage 108 and the base 104 can be varied. The frame 106 projects through a through hole 202 (best shown in FIG. 2). The power tool carriage 108 is optionally moveably coupled to frame 106 via a carriage mechanism (not shown). In some less preferred examples (not shown in the Figs), the power tool carriage 108 is fixed with respect to the frame 106 and does not move with respect to the power tool carriage 108.

The power tool carriage 108 will now be discussed in more detail below with respect to FIG. 1 and FIG. 2.

The frame 106 and the power tool carriage 108 as shown in FIG. 1 are substantially upright. In some examples, the power tool stand 100 can be used in the orientation as shown in FIG. 1 and in this case, the frame 106 and the power tool carriage 108 will remain substantially upright positioned on a workpiece surface (not shown).

However, in some other examples, the power tool stand 100 can be used in a substantially horizontal orientation. In this case, the frame 106 will be substantially horizontal. Indeed, the power tool stand 100 may be used in any orientation as required and the position of the frame 106 will be adjusted accordingly.

The frame 106 as shown in FIG. 1 is a single post projecting up from the base 104. However, in other examples the frame 106 can optionally comprise a plurality of posts (not shown) projecting up from the base 104 and the power tool carriage 108 may be mounted on the plurality of posts. The frame 106 as shown in FIG. 1 is mounted perpendicular to the plane of the base 104 at a coupling 110. The plane of the base can be substantially parallel with the plane of a workpiece (not shown).

In some examples, the coupling 110 optionally comprises a pivot connection and the frame 106 is pivotable with respect to the base 104. In this way, the frame 106 can be angled with respect to a normal axis (not shown) of the plane of a workpiece. The normal axis of the plane of the workpiece and the base 104 is parallel with the longitudinal axis A-A as shown in FIG. 1.

The coupling 110 comprises a screw fastener 112 threaded through arcuate slots 114 in a pair of projecting plates 116 fixed to the base 104. The screw fastener 112 is screwed into the frame 106 or into a reciprocal fastening nut 118 on the opposite side of the frame 106. When the screw fastener 112 and reciprocal fastening nut 118 are tightened against the projecting plates 116 and the frame 106, frictional forces keep the frame 106 fixed with respect to the base 104. Other fastening mechanisms e.g. clips, clamps, or any other suitable means can be used to fix the frame 106 with respect to the base 104.

The pair of projecting plates 116 each comprise an arcuate slot 114 and form a yoke for receiving a portion of the frame 106 between the projecting plates 116. The yoke as shown in FIG. 1 is optional and other pivot connections can be provided. For example a single projecting plate 116 can be used to couple the base 104 to the frame 106. In some examples, the arcuate slot 114 optionally comprises a plurality of indexing positions (not shown) for positioning the reciprocal fastening nut 118 and the screw fastener 112 at predetermined positions along the arcuate slot 114.

Optionally, the projecting plates 116 comprise an inclination scale (not shown) to indicate the angle of the frame 106 with respect to the plane of the base 104. In some examples the frame 106 is arranged to pivot between 0 to 60 degrees from a normal axis (not shown) perpendicular to the base 104. In other examples, the frame 106 can pivot any angle with respect to a normal axis perpendicular to the base 104.

In some examples, the frame 106 is alternatively permanently fixed with respect to the base 104. In this case the frame 106 cannot be adjusted with respect to the base 104. For example, the frame 106 is welded to the base 104 in the upright position as shown in FIG. 1.

In some examples, the frame 106 can be pivotable with respect to base 104 such that the longitudinal axis A-A of the frame 106 can be positioned parallel with the plane of the base 104. This can be useful for transporting the power tool stand 100 to the work site.

In some examples, the frame 106 comprises a reinforced cross-sectional shape for increasing rigidity of the frame 106. The frame 106 can optionally comprise an I-beam cross-sectional shape in some examples.

In some examples, base 104 comprise one or more fixing bolts 120 or tethering points 120 for anchoring the base 104 of the power tool stand 100 to the workpiece. FIG. 1 shows the base 104 comprising four fixing bolts 120 located at each corner of the base 104. In some examples, there can be additional or fewer fixing bolts 120 for anchoring the base 104 to the workpiece as required.

The fixing bolts 120 allow the power tool stand 100 to be securely fastened to a workpiece surface in a horizontal plane, a vertical plane, or an inclined surface. For example, a user may use the fixing bolts 120 to anchor the power tool stand 100 to a floor or a wall before operation.

When the user anchors the base 104 to a vertical surface such as a wall (not shown), the user may disassemble the power tool stand 100 and remove the frame 106 from the base 104. Once the user has anchored the base 104 to the wall, the user may then reattach the frame 106 back on the base 104.

The base 104 optionally comprises wheels 122 for transporting the power tool stand 100 to the worksite. The wheels 122 are mounted on the base 104 such that the wheels 122 do not project beyond an engaging surface 124 of the base 104. The engaging surface 124 is arranged to abut the workpiece surface. Accordingly, the wheels 122 do not touch the workpiece surface when the engaging surface 124 abuts the workpiece surface. In some examples, the wheels 122 are optionally removeable. This means the user can remove the wheels 122 when placing the power tool stand 100 in tight spaces on a wall or a floor.

The base 104 can optionally further comprise one or more stand handles (not shown) for also assisting transportation and handling. The user can optionally grasp the stand handle mounted on the base 104 and the frame 106 in order to move the power tool stand 100 into position.

The power tool stand 100 will now be discussed in more detail with respect to FIG. 1. FIG. 1 shows side view of the power tool stand 100 with the removeable power tool 102 and the removeable battery 130 mounted on the power tool stand 100.

The frame 106 allows a power tool carriage 108 to be precisely moved along the longitudinal axis A-A and then fixed with respect to the frame 106.

Figure 2:
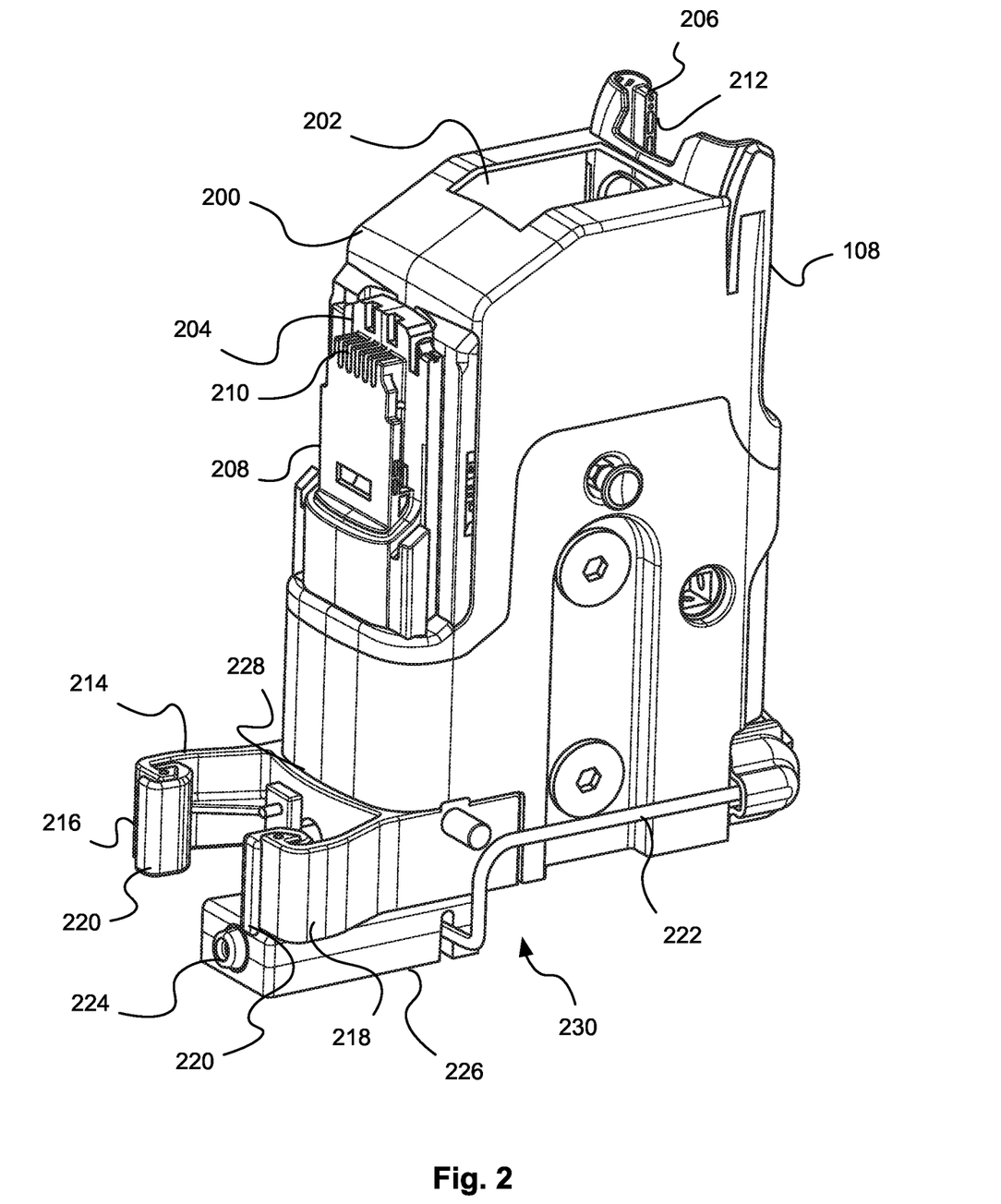
FIG. 2 shows perspective view of part of a power tool stand according to an example.

As shown in FIG. 2, the power tool carriage 108 is arranged to receive a removeable power tool 102 and a removeable battery 130.

The power tool carriage 108 comprises a carriage housing 200. The carriage housing 200 comprises a clam shell type construction having two halves which are fastened together. The halves of the carriage housing 200 are fastened together with screws but in alternative examples any suitable means for fastening the carriage housing 200 together may be used such as glue, clips, bolts and so on. For the purposes of clarity, the fastenings in the carriage housing 200 are not shown in FIG. 2. The carriage housing 200 can comprise a unitary element surrounding the internal components of the power tool carriage 108. In other examples, the carriage housing 200 can comprise one or more housing portions (not shown) which are mounted together to form the carriage housing 200.

The power tool carriage 108 comprises a power tool interface 204 arranged to electrically and mechanically connect the removeable power tool 102 to the power tool carriage 108.

The power tool carriage 108 further comprises a battery interface 206 arranged to electrically and mechanically connect the removeable battery 130 to the power tool carriage 108.

The power tool interface 204 and the battery interface 206 are electrically connected together via one or more internal wires (not shown) routed inside the carriage housing 200. The internal wires can be for example a flexible connection ribbon arranged to electrically couple pairs of electrical contacts on the power tool interface 204 and the battery interface 206. In other examples, power tool interface 204 and the battery interface 206 can be electrically connected by separate wires, a printed circuit board or any other suitable means for electrically connecting the power tool interface 204 and the battery interface 206.

In this way, the removeable power tool 102 and the removeable battery 130 are respectively electrically connected to the power tool interface 204 and the battery interface 206 when mounted to the power tool carriage 108. This means that when mounted to the power tool carriage 108, the removeable battery 130 can supply power to the removeable power tool 102. Accordingly, the removeable power tool 102 can be powered by the removeable battery 130 when the removeable power tool 102 and the removeable battery 130 are mounted on the power tool carriage 108 as if the removeable battery 130 and the removeable power tool 102 are directly coupled together.

In some examples, operation of the removeable power tool 102 when mounted on the power tool stand 100 is no different from when the removeable power tool 102 is directly connected to the removeable battery 130. The user can therefore intuitively use the removeable power tool 102 when mounted on the power tool carriage 108.

As discussed above, both the removeable power tool 102 and the removeable battery 130, are mechanically secured to the power tool carriage 108. This means that the power tool carriage 108 moves in unison with the removeable power tool 102 and the removeable battery 130. This can help the user stabilise the removeable power tool 102 during use and improves the quality of the cut in the workpiece.

In some examples, the power tool interface 204 mounted on the power tool carriage 108 is compatible with the interface on the removeable battery 130. Similarly the battery interface 206 mounted on the power tool carriage 108 is compatible with the interface on the removeable power tool 102. By providing compatible interfaces between the power tool carriage 108, the removeable power tool 102 and the removeable battery 130, the removeable power tool 102 and the removeable battery 130 can be mounted on each other or on the power tool carriage 108.

Compatible interfaces means that the power tool interface 204, and the battery interface 206 can electrically and mechanically couple respectively with the removeable power tool 102 and the removeable battery 130 without having identical structures. For example, there can be small structural variations in the power tool interface 204, and the battery interface 206 in order to incorporate them into the power tool carriage 108.

In some other examples, the power tool interface 204 mounted on the power tool carriage 108 is the same as the interface on the removeable battery 130. Similarly, the battery interface 206 mounted on the power tool carriage 108 is the same as the interface on the removeable power tool 102. Advantageously this means that the same mechanical and electrical interface which mechanically and electrically connect the removeable battery 130 to the removeable power tool 102 can be used to mechanically and electrically connect the removeable battery 130 and the removeable power tool 102 separately to the power tool carriage 108.

This means that the same method of attaching the removeable battery 130 to the removeable power tool 102 can be used for attaching each of the removeable battery 130 and the removeable power tool 102 to the power tool carriage 108. Accordingly, mounting the removeable battery 130 and the removeable power tool 102 to the power tool carriage 108 is intuitive for the user already familiar with the removeable battery 130 and the removeable power tool 102.

In order to mount the removeable battery 130 and the removeable power tool 102 on the power tool carriage 108, in some examples, both the removeable battery 130 and the removeable power tool 102 slide into mechanical engagement with the power tool carriage 108. The sliding action of the removeable battery 130 and the removeable power tool 102 continues until a latch mechanism (not shown) engages between the power tool carriage 108 and the removeable battery 130 and/or the removeable power tool 102. In some examples, the battery interface 206 and the power tool interface 204 comprise two latch mechanisms which are the same as the latch mechanism used to hold the removeable battery 130 in engagement when the mounted to the removeable power tool 102.

Mounting the removeable power tool 102 and the removeable battery 130 on the power tool stand 100 will now be discussed in more detail in reference to FIG. 2.

FIG. 2 shows the power tool carriage 108 without the removeable power tool 102 or the removeable battery 130.

The power tool interface 204 as shown in FIG. 2 comprises a power tool mechanical interface 208 and a power tool electrical interface 210. In some examples, the power tool mechanical interface 208 and the power tool electrical interface 210 are integral with the carriage housing 200. For example, the power tool mechanical interface 208 and the power tool electrical interface 210 are moulded into the carriage housing 200. In some examples, the power tool mechanical interface 208 and the power tool electrical interface 210 are positioned together or near each other on the carriage housing 200. In some other less preferred examples, the power tool mechanical interface 208 and the power tool electrical interface 210 are located remote from each other on the carriage housing 200.

As shown in FIG. 2, the power tool mechanical interface 208 optionally comprises a pair of rails configured to engage with reciprocal slots mounted on the removeable power tool 102. The pair of rails slide into engagement with the reciprocal slots and secure the removeable power tool 102 to the power tool carriage 108.

The power tool electrical interface 210 optionally comprises a plurality of electrical contact clips (not shown) configured to engage a plurality of reciprocal projecting contact ribs (not shown) mounted on the removeable power tool 102. The power tool mechanical interface 208 and the power tool electrical interface 210 are one optional way of connecting the removeable power tool 102 to the power tool carriage 108.

The battery interface 206 as shown in FIG. 2 comprises a battery mechanical interface 212 and a battery electrical interface (not shown in FIG. 2). In some examples, the battery mechanical interface 212 and the battery electrical interface are integral with the carriage housing 200. For example, the battery mechanical interface 212 and the battery electrical interface are moulded into the carriage housing 200. In some examples, the battery mechanical interface 212 and battery electrical interface are positioned together or near each other on the carriage housing 200. In some other less preferred examples, the battery mechanical interface 212 and the battery electrical interface are located remote from each other on the carriage housing 200.

The battery mechanical interface 212 optionally comprises a pair of slots (not shown) configured to engage with reciprocal rails (not shown) mounted on the removeable battery 130. The battery electrical interface comprises a plurality of projecting electrical contact ribs (not shown) configured to engage a plurality of reciprocal electrical contact clips (not shown) mounted on the removeable battery 130. The battery mechanical interface 212 and the battery electrical interface are one optional way of connecting the removeable power tool 102 to the power tool carriage 108.

In some examples, each of the power tool mechanical interface 208 and the battery mechanical interface 212 can optionally comprises a plurality of rails and slots to further improve the mechanical engagement when mounting the removeable power tool 102 and the removeable battery 130 on the power tool carriage 108. For example, each of the power tool mechanical interface 208 and the battery mechanical interface 212 can each comprise both slots and rails arranged to respectively engage with reciprocal rails and slots.

Alternatively, other mechanisms and features can be used for securely connecting the removeable power tool 102 to the power tool carriage 108. For example, in some less preferred alternatives, the rail and slot arrangement as discussed above is not used for mechanically securing the removeable battery 130 and the removeable power tool 102 to the power tool carriage 108. In this case, other external features on the removeable battery 130 and the removeable power tool 102 are used to securely fasten the removeable battery 130 and the removeable power tool 102 to the power tool carriage 108. In some examples, latches, straps, clips, clamps or any other suitable securing mechanism can be used to secure the removeable battery 130 and the removeable power tool 102.

As mentioned above, in some less preferred examples, the battery interface 206 comprises a battery mechanical interface 212 and a battery electrical interface in separate locations on the power tool carriage 108. Similarly, the power tool interface 204 comprises a power tool mechanical interface 208 and a power tool electrical interface 210 in separate locations on the power tool carriage 108. This can be optionally achieved by making a separate electrical connection not using the previously discussed electrical contacts. For example, the battery electrical interface and the power tool electrical interface 210 can be flexible ribbons projecting through the carriage housing 200 and the flexible ribbons have a plurality of electrical contacts connected thereto. The flexible ribbons can be manually attached to the ensure an electrical connection with the removeable power tool 102 and the removeable battery 130.

In another less preferred example, the removeable battery 130 can be mounted on the power tool carriage 108 in a different direction e.g. opposite or inclined to the direction that the removeable power tool 102 is mounted on the power tool carriage 108.

In some other examples as shown in e.g. FIG. 1 and FIG. 2, the removeable power tool 102 is mounted to the power tool carriage 108 at a plurality of other mechanical couplings in addition to the power tool mechanical interface 208. Another mechanical coupling will now be discussed in reference to FIG. 2.

The power tool carriage 108 optionally comprises a tool clamp 214 configured to secure the removeable power tool 102 to the power tool stand 100. The tool clamp 214 is configured to engage a nose portion 126 (best shown in FIG. 1) of a housing 134 of the removeable power tool 102. The tool clamp 214 may optionally be secured to the nose portion 126 of the removeable power tool 102. When the tool clamp 214 is engaged with the nose portion 126, the removeable power tool 102 is further mechanically coupled to the power tool carriage 108. The coupling between the removeable power tool 102 and the power tool carriage 108 will be discussed in more detail below.

The tool clamp 214 optionally comprises a first clamp arm 216 and a second clamp arm 218 configured to urge towards each other. The first clamp arm 216 and the second clamp arm 218 each comprise a clamp jaw 220. The clamp jaws 220 on the first and second clamp arms 216, 218 are configured to engage a reciprocal housing recess in the nose portion 126 of the housing 134 of the removeable power tool 102. When the first and second clamp arms 216, 218 are engaged with the nose portion 126 between the first and second clamp arms 216, 218, the first and second clamp arms 216, 218 exert a gripping force against the nose portion 126.

By mounting the removeable power tool 102 to the power tool carriage 108 with the tool clamp 214, the removeable power tool 102 does not move with respect to the power tool carriage 108. This means that the user can have the confidence that the removeable power tool 102 is securely mounted to the power tool stand 100 when performing a cutting operation.

The carriage mechanism (not shown) is mounted within the carriage housing 200 and is in some examples arranged to move the power tool carriage 108 with respect to the frame 106 when the carriage mechanism is actuated.

In some examples, the carriage mechanism comprises a rack (not shown) and pinion mechanism (not shown) for moving the power tool carriage 108 with respect to the frame 106. A rack is mounted on one side of the frame 106 along the length of the frame 106. A drive gear is mounted on a drive shaft and a mechanism handle 128 is mounted on the drive shaft for manually rotating the drive shaft. The drive gear is optionally rotatably coupled to an intermediate gear and the intermediate gear engages the rack. In some other examples, the drive gear directly engages with the rack. In some other examples, any other suitable mechanism can be used to move the power tool carriage 108 with respect to the frame 106.

A problem some removable power tools 102 e.g. diamond core drills is that they need suitable dust management and lubrication management during operation. The power tool stand 100 as shown in the Figs. comprises suitable dust management and lubrication management which will now be discussed in more detail.

The power tool carriage 108 comprises at least one duct 222 configured to convey a fluid. The at least one duct 222 in some examples is configured to supply a lubrication fluid such as water to the removeable power tool 102. Accordingly, the at least one duct 222 is in fluid communication with a lubrication fluid supply e.g. a water supply such as a pump (not shown) or a water tap (not shown). This allows the at least one duct 222 to supply water to the removeable power tool 102 during use.

In some other examples, the at least one duct 222 is in fluid communication with an air supply or a vacuum source. Accordingly, the at least one duct 222 is in fluid communication with an air supply or a vacuum source e.g. a compressed air supply (not shown) or a vacuum pump (not shown). This allows the at least one duct 222 to extract debris from the removeable power tool 102.

The at least one duct 222 can be optionally used for conveying a fluid e.g. a lubrication fluid such as water towards the removeable power tool 102 or conveying a fluid e.g. an airflow away from the removeable power tool 102. Hereinafter, the at least one duct 222 will be referred to as a water duct 222, but this could also be an air duct as previously discussed.

As shown in FIG. 2 the water duct 222 is mounted on the outside of the power tool carriage 108. The water duct 222 extends along the surface of the power tool carriage 108. Although not shown, in some examples, the water duct 222 can be secured to the power tool carriage 108 with clips, clamps, or adhesive or any other suitable means. In some alternative examples which are not shown, the water duct 222 is mounted inside the power tool carriage 108.

The water duct 222 comprises a duct inlet (not shown) in fluid communication with the water supply. In some examples, the duct inlet comprises a toolless connector for connecting to a water hose. The toolless connector allows for a snap fit connection between the duct inlet and a water hose (not shown). The water duct 222 is also in fluid communication with a moveable fluid connector 224. The water duct 222 can supply water to the moveable fluid connector 224. The moveable fluid connector 224 is moveable between a first position and a second position. FIG. 2. shows the moveable fluid connector 224 in the first position.

Figure 3:
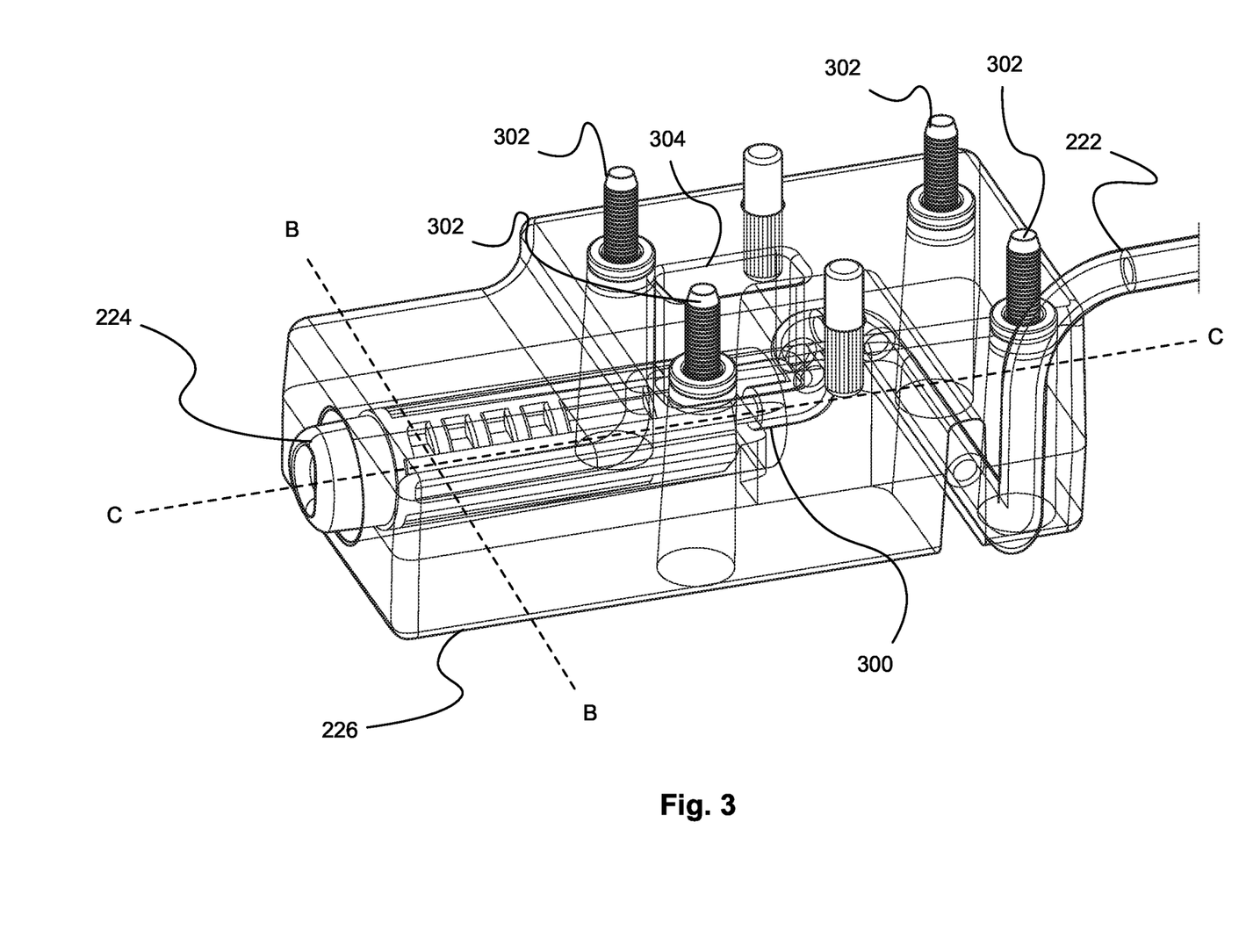
FIG. 3 shows a perspective view of another part of a power tool stand according to an example.

The first position is a retracted position wherein the moveable fluid connector 224 is disengaged from the removeable power tool 102. When the moveable fluid connector 224 is in the first position the moveable fluid connector 224 is retracted into a connector housing 226. The connector housing 226 protects the moveable fluid connector 224 and houses a fluid connection between a duct outlet 300 (best shown in FIG. 3) of water duct 222 and the moveable fluid connector 224. FIG. 3 also shows the moveable fluid connector 224 in the first position.

When the moveable fluid connector 224 is in the first position, it is positioned within the connector housing 226 and does not block the movement of the removeable power tool 102. In some examples, at least part of the water duct 222 is flexible near the duct outlet 300. Alternatively, the entire water duct 222 is a made from a flexible material. This means that the duct outlet 300 remains connected to the moveable fluid connector 224 as the moveable fluid connector 224 moves between the first position and the second position. In some examples, the water duct 222 is a flexible silicone tube. In some other examples the water duct 222 is a rubber tube or any other suitable flexible conduit.

The moveable fluid connector 224 can be connectable with a portion of the removeable power tool 102 when mounted on the power tool carriage 108. For example, the Alternatively, or additionally the moveable fluid connector 224 is connectable with an accessory such as a nozzle (not shown).

Figure 8:
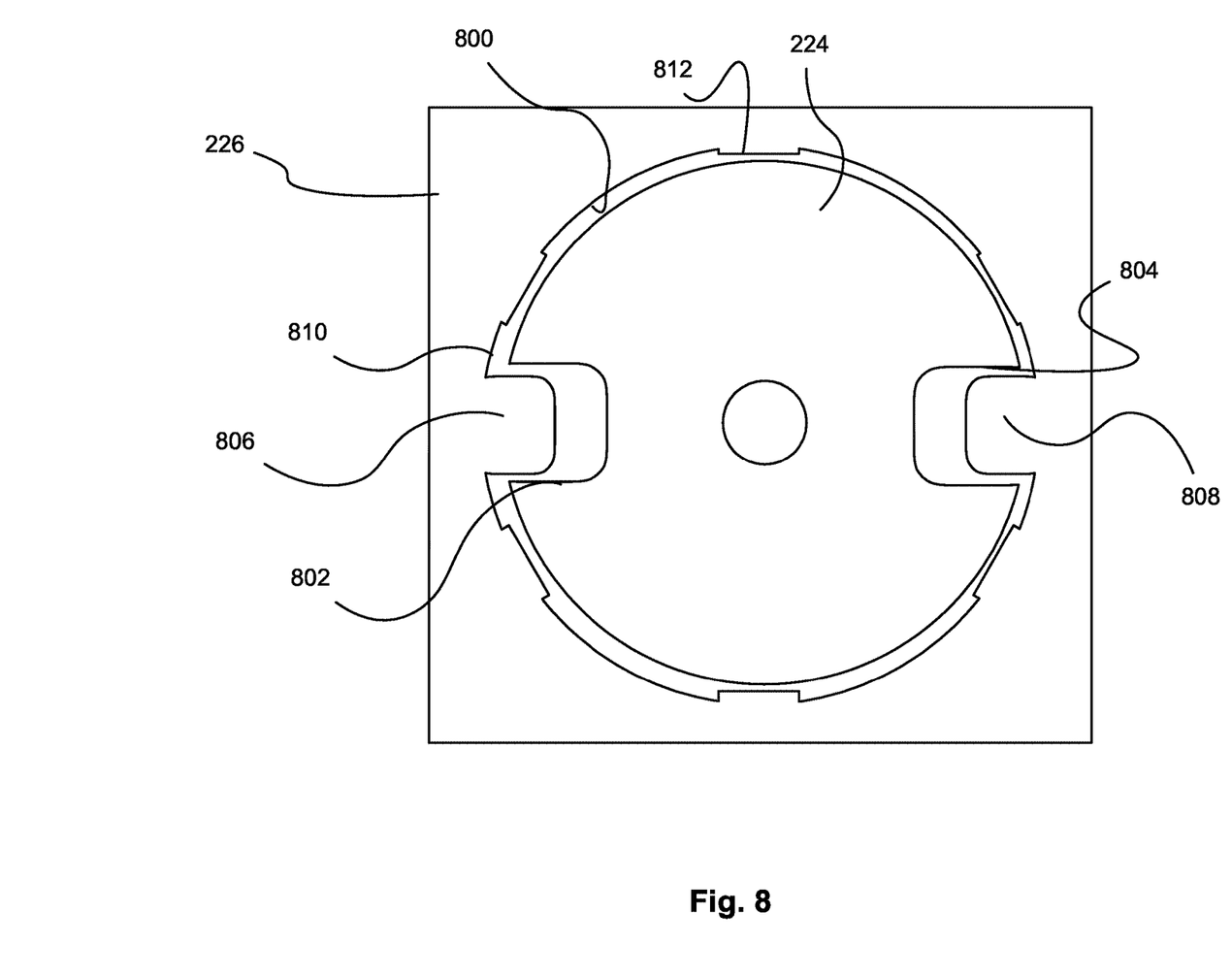
FIG. 8 shows a cross sectional view of part of a power too stand according to an example.

The moveable fluid connector 224 will now be discussed in more detail with reference to FIG. 8. FIG. 8 is a cross sectional view of the moveable fluid connector 224 along the axis B-B as shown in FIG. 3.

The moveable fluid connector 224 is slidably engageable within a connector bore 800 in the connector housing 226. The connector bore 800 comprises a diameter larger than the moveable fluid connector 224 such that the moveable fluid connector 224 is freely slidable within the connector bore 800. The connector housing 226 is only shown in part in FIG. 8 for the purposes of clarity.

Optionally, the moveable fluid connector 224 comprises a first elongate guide slot 802 and a second elongate guide slot 804. The first elongate guide slot 802 and the second elongate guide slot 804 are respectively configured to engage with a first elongate guide rail 806 and a second elongate guide rail 808. The first and second elongate guide rails 806, 808 are mounted to the inner surface 810 of the connector bore 800. In this way, the first elongate guide slot 802, the second elongate guide slot 804, the first elongate guide rail 806, and the second elongate guide rail 808 maintain the orientation of the moveable fluid connector 224 with respect to the connector housing 226 when the moveable fluid connector 224 moves from the first position to the second position. In other words, the moveable fluid connector 224 does not rotate with respect to the connector housing 226 due to the first elongate guide slot 802, the second elongate guide slot 804, the first elongate guide rail 806, and the second elongate guide rail 808.

Optionally, the connector bore 800 comprises a plurality of secondary guide ribs 812 (only one secondary guide rib 812 is labelled in FIG. 8 for the purposes of clarity). The plurality of secondary guide ribs 812 are configured to align the moveable fluid connector 224 such that the longitudinal axis C-C (best shown in FIG. 3) of the moveable fluid connector 224 remains parallel to the longitudinal axis C-C of the connector bore 800. In some examples, as shown in the accompanying Figs, the longitudinal axis C-of the moveable fluid connector 224 is coaxial with the longitudinal axis C-C of the connector bore 800.

Figure 4:
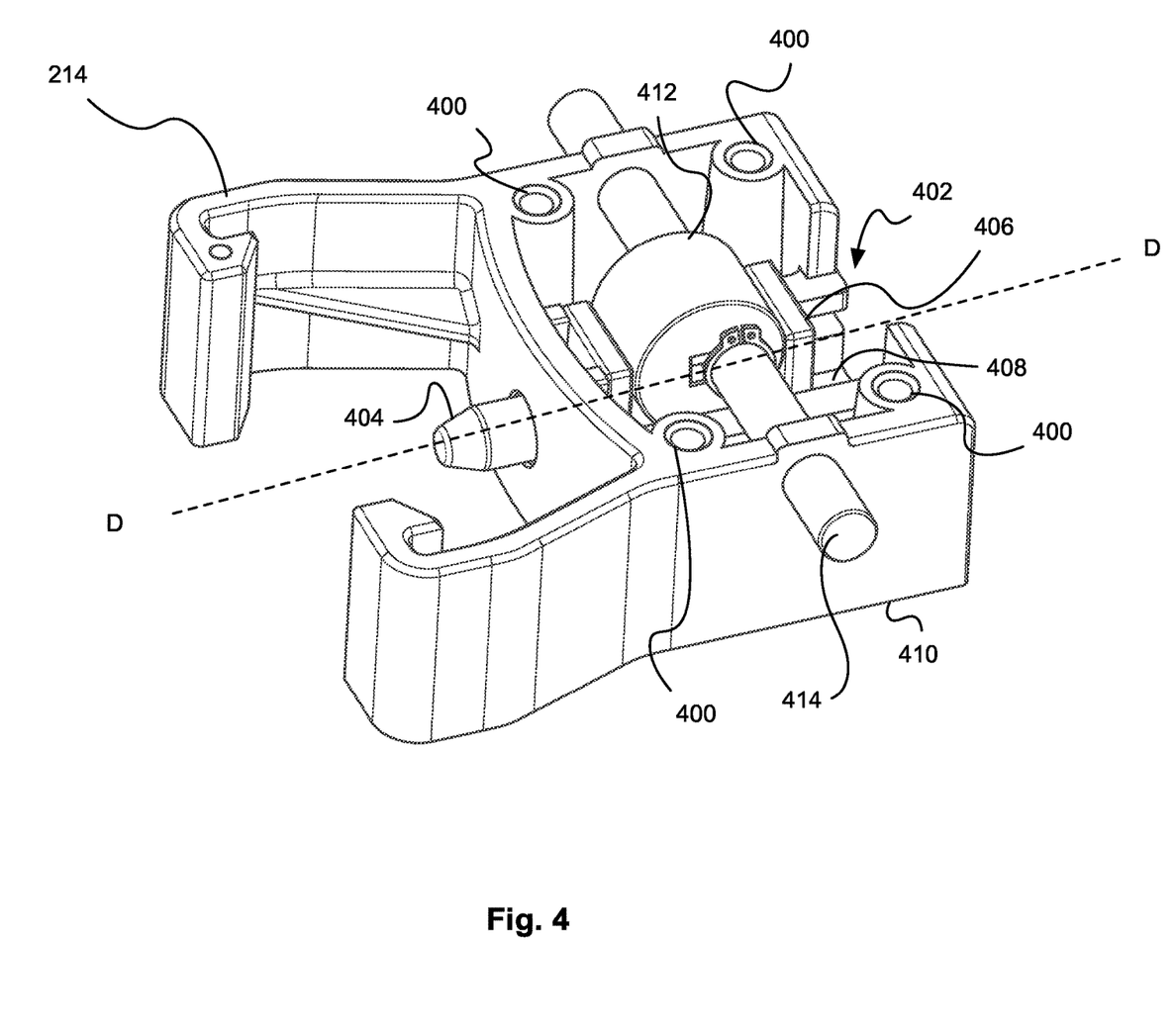
FIG. 4 shows a perspective view of another part of a power tool stand according to an example.

The tool clamp 214 will now be discussed in more detail with respect to FIGS. 4, 5 and 6. FIG. 4 shows a perspective view of the tool clamp 214. FIGS. 5 and 6 show plan cross sectional views of the tool clamp 214 in different modes of operation.

The tool clamp 214 is mountable to the power tool carriage 108. As shown in FIG. 2, the tool clamp 214 is mounted to a shoulder portion 228 on the underside 230 of the power tool carriage 108. The tool clamp 214 is fixed to the power tool carriage 108 via a plurality of screw fastenings in a plurality of screw holes 400.

In some examples, the tool clamp 214 optionally comprises a locking mechanism 402. The locking mechanism 402 is configured to move between a locked position and an unlocked position. The locking mechanism 402 is arranged to secure the removeable power tool 102 to the power tool carriage 108 in the locked position and release the removeable power tool 102 from the power tool carriage 108 in the unlocked position. The locking mechanism 402 as shown in FIG. 4 is in the locked position.

The locking mechanism 402 comprises a locking bolt 404 configured to engage a reciprocal locking pin hole in the removeable power tool 102. The locking bolt 404 is mechanically coupled to a slider 406. The slider 406 is configured to reciprocally move along the axis D-D as shown in FIG. 4. The reciprocal movement of the slider 406 causes the locking bolt 404 to move between the locked position and the unlocked position. The slider 406 is mounted within a slider slot 408 formed in a tool clamp base 410.

The slider 406 is mechanically coupled to an actuating eccentric 412 and the slider comprises a slider recess 600 (best shown in FIG. 6) configured to engage the actuating eccentric 412. The actuating eccentric 412 is mounted off-centre on a rotatable shaft 414. The rotatable shaft 414 comprises a slot for receiving a tool or handle for manually actuating the locking mechanism 402. The actuating eccentric 412 comprises a square hole 602 which is mounted to a portion of the rotatable shaft 414 with a reciprocal square profile.

Figure 5A:
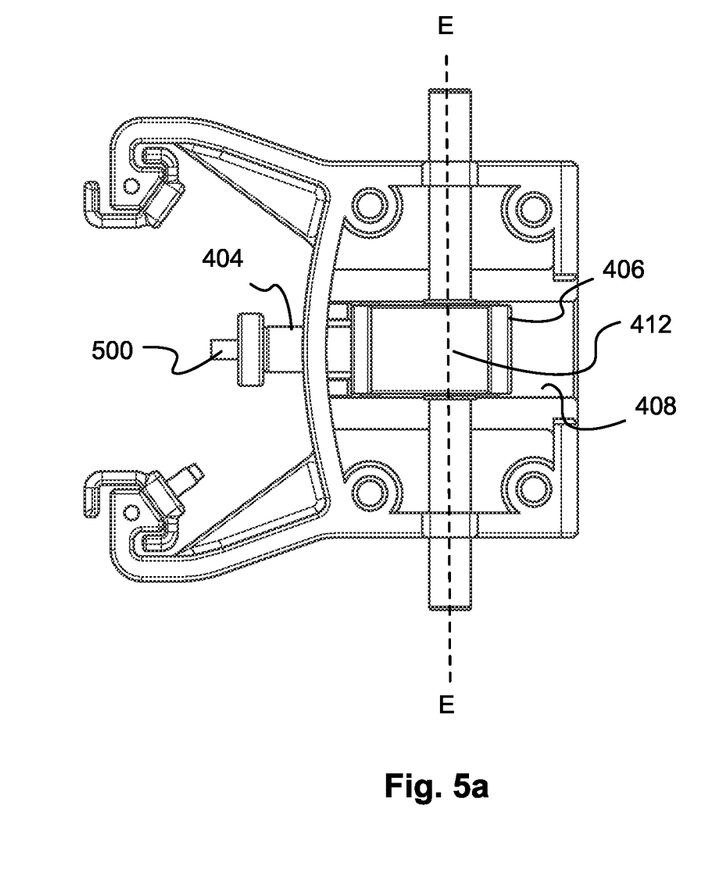
FIG. 5a shows a plan cross sectional view of another part of a power tool stand according to an example.
Figure 5B:
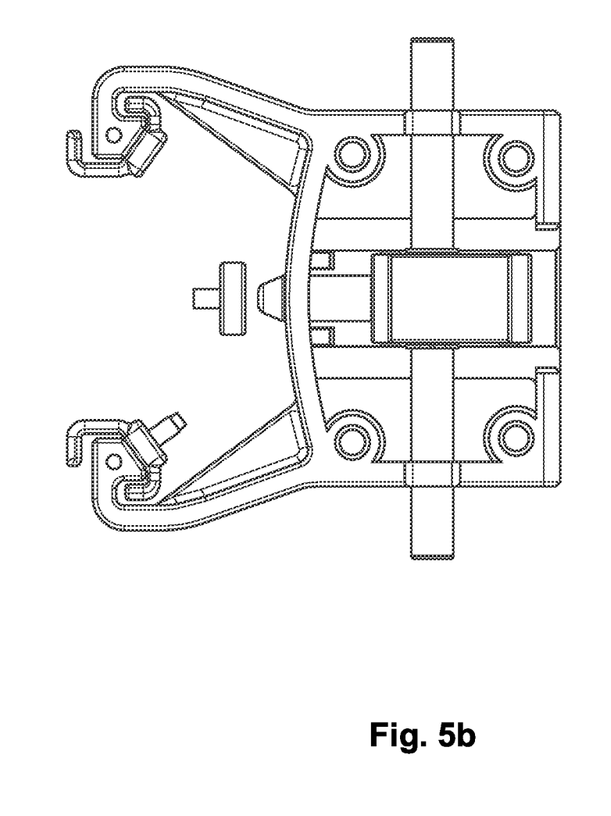
FIG. 5b shows a plan cross sectional view of another part of a power tool stand according to an example.
Figure 6:
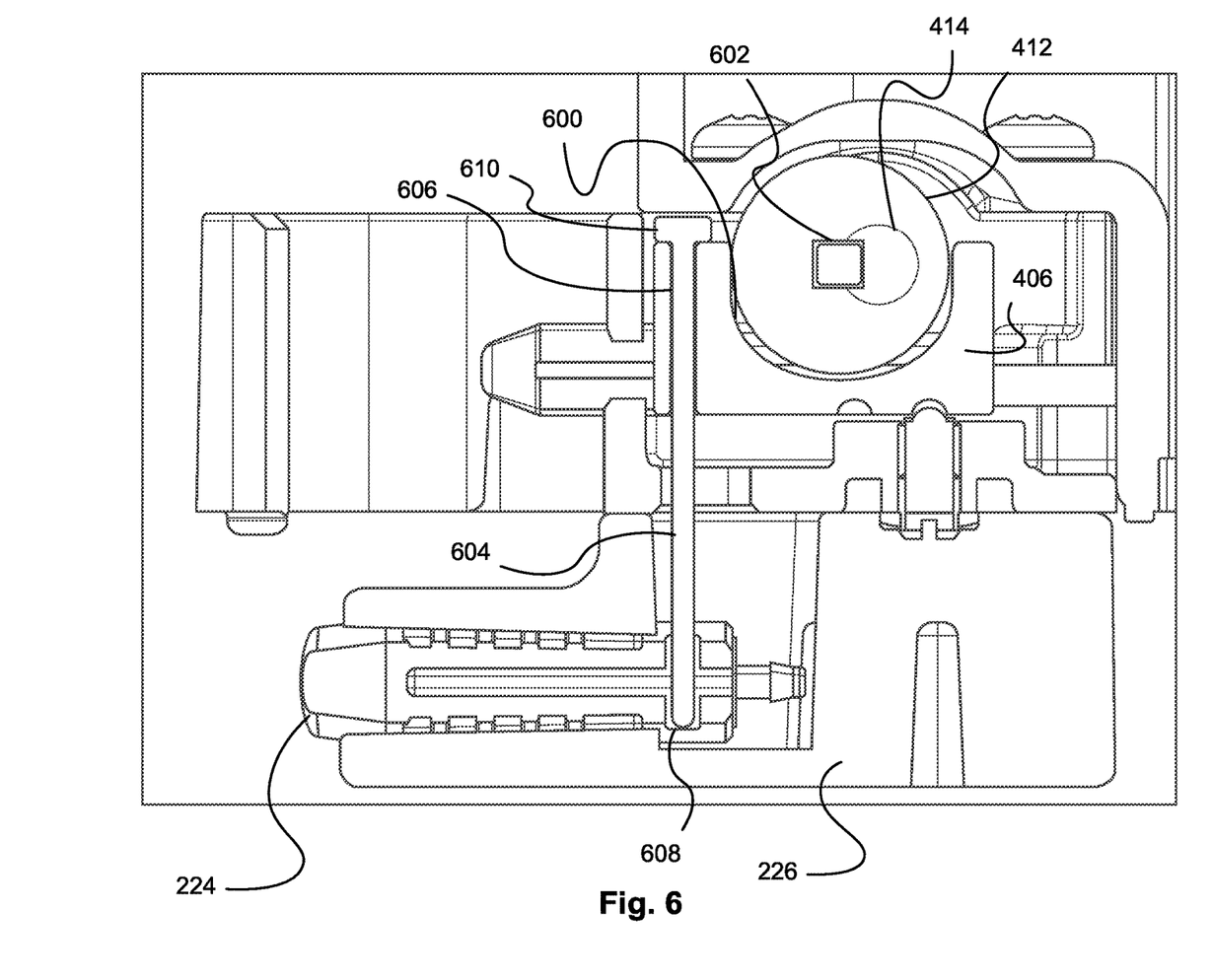
FIG. 6 shows a side cross sectional view of a power tool stand according to an example.

Accordingly, as the rotatable shaft 414 is rotated about the axis E-E of the rotatable shaft 414, the actuating eccentric 412 moves from a first eccentric position as shown in FIG. 5b to a second eccentric position as shown in FIG. 5a. When the actuating eccentric 412 is in the first eccentric position as shown in FIG. 5b, the locking bolt 404 is in the unlocked position. When the actuating eccentric 412 is in the second eccentric position as shown in FIG. 5a, the locking bolt 404 is in the locked position. The locking bolt 404 engages a portion 500 of the removeable power tool 102 when the locking mechanism 402 is in the locking position. When the locking mechanism 402 is in the unlocked position, the locking bolt 404 is disengaged from the portion 500 of the removeable power tool 102.

The locking mechanism 402 means that the user can positively secure the removeable power tool 102 to the power tool stand 100. This means that the removeable power tool 102 is less likely to be accidentally removed from the power tool stand 100.

Figure 7:
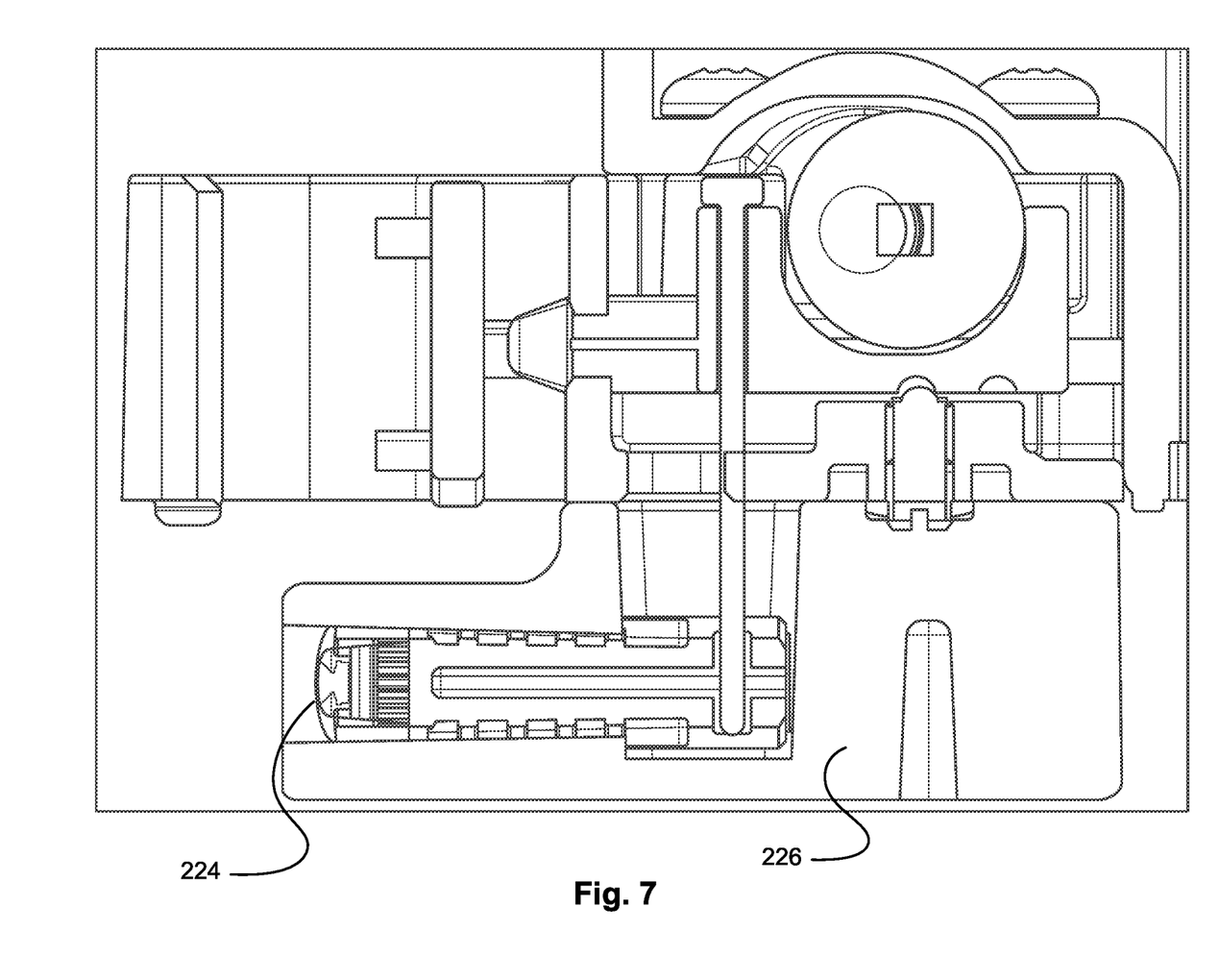
FIG. 7 shows a side cross sectional view of a power tool stand according to an example.

The actuation of the moveable fluid connector 224 will now be discussed further with reference to FIGS. 6 and 7. FIGS. 6 and 7 show a cross sectional view of the power tool carriage 108, the tool clamp 214 and the moveable fluid connector 224 respectively in different modes of operation. FIG. 6 shows the moveable fluid connector 224 in the second position where the moveable fluid connector 224 is extended out of the connector housing 226. FIG. 7 shows the moveable fluid connector 224 in the first position where the moveable fluid connector 224 is retracted into the connector housing 226.

As shown in FIG. 3, the connector housing 226 comprises a plurality of connector housing fastenings 302 configured to secure to the underside of the tool clamp 214. FIG. 3 shows the power tool carriage 108, the tool clamp 214 and the connector housing 226 assembled together.

A connecting linkage 604 is coupled between the slider 406 and the moveable fluid connector 224. This means that when the slider 406 moves the moveable fluid connector 224 also moves. The connecting linkage 604 extends through a first linkage bore 606 in the slider 406 and projects into a second linkage bore 608 in the moveable fluid connector 224. The connecting linkage 604 comprises a flange 610 so that the connecting linkage 604 is secured with respect to the slider 406.

The connector housing 226 comprises a linkage slot 304 for receiving the connecting linkage 604. The linkage slot 304 is elongate so that the connector housing 226 does not interfere with the movement of the connecting linkage 604 when the moveable fluid connector 224 moves between the first position and the second position.

When the user turns the rotatable shaft 414, the actuating eccentric 412 moves the slider 406 forwards towards to removeable power tool 102. For example the user turns the rotatable shaft 414 as shown in FIG. 7 in either a clockwise or anticlockwise direction by a half turn. This causes the locking bolt 404, the connecting linkage 606 and the moveable fluid connector 224 to move towards the removeable power tool 102. That is the moveable fluid connector 224 moves from the first position to the second position and the locking bolt 404 moves from the unlocked position to the locked position. Accordingly, the removeable power tool 102 is secured to the power tool stand 100. At the same time the water duct 222 is in fluid communication with the removable power tool 102 and water is supplied to the removeable power tool 102.

When the user turns the rotatable shaft 414 again, the actuating eccentric 412 moves the slider 406 backwards away from removeable power tool 102. For example the user turns the rotatable shaft 414 as shown in FIG. 6 in either a clockwise or anticlockwise direction by a half turn. This causes the locking bolt 404, the connecting linkage 606 and the moveable fluid connector 224 to move away from the removeable power tool 102. That is the moveable fluid connector 224 moves from the second position to the first position and the locking bolt 404 moves from the locked position to the unlocked position. Accordingly, the removeable power tool 102 is not secured to the power tool stand 100 and can be removed by the user.

By connecting the locking mechanism 402 and the moveable fluid connector 224 with the connecting linkage 604, the locking mechanism 402 and the moveable fluid connector 224 can be actuated by the user with the same action.

The locking mechanism 402 as shown in FIGS. 4, 5, 6 is preferred but optional. In some other examples there is no locking mechanism 402. Instead, there is only the connecting linkage 604 coupled between the slider 406 and the moveable fluid connector 224. Accordingly, when the actuating eccentric 412 is rotated, only the moveable fluid connector 224 moves. For example, the moveable fluid connector 224 in some examples is robust enough to also physically secure the removeable power tool 102 to the power tool stand 100 when the moveable fluid connector 224 is in the second position.

In some examples, the water duct 222 comprises a valve (not shown) arranged to selectively adjust the flow of fluid to and/or from the removeable power tool 102. The valve is in fluid communication between the water duct 222 and moveable fluid connector 224. The valve is arranged to be adjustable by the user to selectively adjust the flow of water to the cutting tool 132. The user can optionally fully open or fully close the valve in order to actuate the flow of water through the water duct 222. Furthermore, the valve can optionally be positioned at any position between a fully closed and a fully opened state. This means that the user can adjust the flow rate by manipulating the valve on the power tool carriage 108 depending on the amount of lubrication required during a cutting operation. This is advantageous because the user does not have adjust the flow rate at the water supply, which may be remote from the power tool stand 100.

Additionally or alternatively, the at least one duct 222 can be an air duct. This means that the user can connect a vacuum supply to the at least one duct 222 so that dust is sucked away from the cutting tool 132 via the at least one duct 222.

In another example, two or more examples or features are combined. Features of one example can be combined with features of other examples e.g. any of the features described above in on example or shown in one or more Figures can be combined with one or more other features described above or shown in one or more Figures.

Examples of the present disclosure have been discussed with particular reference to the examples illustrated. However it will be appreciated that variations and modifications may be made to the examples described within the scope of the disclosure.

The invention claimed is:

1. A power tool stand comprising:
a base;
a frame connected to the base;
a power tool carriage mounted on the frame; and
a tool interface mounted on the power tool carriage arranged to secure a removeable power tool;
wherein the power tool carriage comprises at least one duct configured to convey a fluid; and
the tool interface comprises a moveable fluid connector in fluid communication with the at least one duct wherein the moveable fluid connector is configured to move from a first position to a second position.

2. The power tool stand according to claim 1, wherein the moveable fluid connector is slidable between the first position and the second position.

3. The power tool stand according to claim 2, wherein the power tool stand comprises a slider mechanically coupled to the moveable fluid connector and an actuating eccentric and the slider comprises a recess configured to engage the actuating eccentric.

4. The power tool stand according claim 1, wherein the moveable fluid connector is configured to engage with a power tool fluid duct when the moveable fluid connector is in the second position and the removeable power tool is mounted to the power tool carriage.

5. The power tool stand according to claim 1, wherein the power tool stand comprises a locking mechanism arranged to secure the removeable power tool to the power tool carriage in a locked position and release the removeable power tool in an unlocked position.

6. The power tool stand according to claim 5 wherein the locking mechanism comprises a locking bolt configured to engage a reciprocal recess in the removeable power tool when the locking mechanism is in the locked position.

7. The power tool stand according to claim 6, wherein the locking mechanism comprises at least one linkage mechanically coupled to the moveable fluid connector.

8. The power tool stand according claim 7, wherein when the locking mechanism moves from the unlocked position to the locked position the at least one linkage is configured move the moveable fluid connector from the first position to the second position.

9. The power tool stand according to claim 1, wherein the moveable fluid connector is slidably mounted in a connector bore and the connector bore comprises at least one elongate guide rib and the moveable fluid connector comprises at least one slot configured to engage with the at least one elongate guide rib.

10. The power tool stand according to claim 1, wherein the at least one duct is a water duct connectable to a supply of water.

11. The power tool stand according to claim 1, wherein the at least one duct is an air duct connectable to supply of air or a vacuum supply.

12. The power tool stand according to claim 1, wherein the at least one duct comprises a duct inlet mounted on a first side of the power tool carriage.

13. The power tool stand according to claim 12, wherein the duct inlet comprises a toolless connection arranged to connect to a water hose, an air hose, or a vacuum hose.

14. The power tool stand according to claim 1, wherein the moveable fluid connector is mounted on a second side of the power tool carriage.

15. The power tool stand according to claim 1, wherein the at least one duct is connectable to a valve arranged to selectively adjust the flow of fluid at least one of to or from a portion of the removeable power tool.

16. The power tool stand according to claim 1, wherein the power tool carriage comprises a housing and the at least one duct is routed inside the housing.

17. The power tool stand according to claim 1, wherein the tool interface comprises a power tool interface mounted on the power tool carriage arranged to mechanically and electrically connect the removeable power tool to the power tool carriage.

18. The power tool stand according claim 1, wherein the tool interface comprises a battery interface mounted on the power tool carriage arranged to mechanically and electrically connect a removeable battery to the power tool carriage.

* * * * *